United States Patent [19]

Moskowitz

[11] Patent Number: 5,539,735
[45] Date of Patent: Jul. 23, 1996

[54] DIGITAL INFORMATION COMMODITIES EXCHANGE

[76] Inventor: Scott A. Moskowitz, 3-5-10 Fukazawa, Setagaya-ku, Tokyo 158, Japan

[21] Appl. No.: 365,454

[22] Filed: Dec. 28, 1994

Related U.S. Application Data

[63] Continuation of Ser. No. 83,593, Jun. 30, 1993, Pat. No. 5,428,606.

[51] Int. Cl.$^6$ ........................................................ H04J 3/26
[52] U.S. Cl. .............................. 370/60; 375/260; 348/10; 370/94.1
[58] Field of Search .......................... 370/60, 60.1, 94.1, 370/32, 53, 54.1, 58.1, 58.2; 358/407, 435; 348/7, 10, 12, 13; 379/62, 90, 61, 110, 219, 220; 455/5.1; 375/260

[56] References Cited

U.S. PATENT DOCUMENTS

| | | | |
|---|---|---|---|
| 3,997,718 | 12/1976 | Ricketts et al. | 348/13 |
| 4,326,289 | 4/1982 | Dickinson | 370/85.8 |
| 4,367,548 | 1/1983 | Cotten et al. | 348/10 |
| 4,395,780 | 7/1983 | Gohm et al. | 455/5.1 |
| 4,491,983 | 1/1985 | Pinnow et al. | 348/10 |
| 4,958,341 | 9/1990 | Hemmady et al. | 370/60.1 |
| 5,428,606 | 7/1995 | Moskowitz | 370/60 |

Primary Examiner—Melvin Marcelo
Assistant Examiner—Huy D. Vu
Attorney, Agent, or Firm—Kenyon & Kenyon

[57] ABSTRACT

A system for the exchange of digital information packets includes an exchange with connectors to allow modular expandable units to connect to the exchange over transmission media. The modular expandable units send digital information packets from one to another over the exchange in response to requests for these digital information packets. The exchange allows for billing and other administrative functions.

9 Claims, 3 Drawing Sheets

5,539,735

DIGITAL INFORMATION COMMODITIES EXCHANGE

This is a continuation of Ser. No. 08/083,593 filed Jun. 30, 1993, now U.S. Pat. No. 5,428,606.

BACKGROUND OF THE INVENTION

The present invention relates generally to an information network, and more particularly to a digital information exchange system where users can send and receive multiple types of data.

A multitude of electronic bulletin boards are in use today. Such bulletin boards generally consist of a particular type of data and are geared to a particular market. Generally, a subscriber has an interest in a particular subject, connects to a bulletin board corresponding to that subject, and retrieves information from it. Occasionally a subscriber may leave some information on a bulletin board, either for use by another subscriber or to an administrator of the board, but generally the flow of information is downstream, i.e., from the board to the subscriber.

Different commercial embodiments of electronic bulletin boards vary in the types of digital data used, however, they are similar in the general direction of the flow of data. For example, the Prodigy® and Compuserve® systems are very popular news and entertainment services. With the exception of their electronic mail, shopping facilities, and billing, the flow of information is towards the subscriber. Similarly, the Audio Archive in Syracuse, N.Y., provides hundreds of thousands of downloadable audio recordings to subscribers. The only information sent upstream by the subscriber is the choice of recording.

There are also a number of prior art patents disclosing such a downstream, unidirectional flow of data, e.g., U.S. Pat. No. 5,132,992 to Yurt et al., U.S. Pat. No. 4,326,289 to Dickinson, and U.S. Pat. No. 4,491,983 to Pinnow.

The above systems demonstrate a basic limitation of the traditional digital communications system, namely, the subscriber is limited to a particular library and is limited to a particular data type. There is a need for a system in which a vast number of participants can act as providers as well as consumers of data, in the manner of a commodities exchange. Such a system would give rise to a much larger number of producers of data than is presently available. This could ultimately provide a wider range of information topics available to information seekers and would provide more of an information marketplace.

It is also believed that it would be desirable and possible to provide data for almost any and every interest. In essence, it would be desirable to provide a multimedia system, in which all types of digital data (music, text, moving video, virtual reality, etc.) could be published and subsequently subscribed to by consumers using their information or entertainment system, and which could be expanded to adapt to the different data types thereby further expanding the digital information marketplace.

SUMMARY OF THE INVENTION

The present invention is directed to the problem of developing a digital information commodities exchange in which the data flow is bidirectional rather than unidirectional and in which subscribers can exchange information with each other through the system. The present invention is also directed to the problem of accommodating different data types within the same modular system, thus allowing for an exchange of an unlimited range of digital commodities.

The present invention removes the limitations of the electronic bulletin boards described above in the following way. An exchange system is provided, but it is not the ultimate source of any data itself. The exchange system is simply a conduit through which users can perform digital transactions. To further support the development of a data marketplace, the exchange can also provide administrative functions such as billing.

These digital transactions are facilitated by modular, expandable units operated by publishers and subscribers. A publisher makes a publication available to the exchange via the publisher's own modular expandable unit. Likewise, a subscriber can then subscribe to this publication, using his or her own modular expandable unit, by contacting the exchange to receive the desired publication. Any such transaction (publication or subscription) may result in charges to both or neither or one of the parties involved. Because the system is a true bilateral exchange, any supplier can also be a subscriber and similarly any subscriber can be a supplier. The modular expandable units enable the publisher/subscriber to upload and download data in a variety of formats, such as music, text, and computer programs (e.g., personal computer programs, Nintendo programs, etc.) by their inherent expandability. The modular expandable units are also expandable with respect to the form of data transmission, so as to accommodate telephone, satellite, electric power lines, CATV, cellular or fiber optic communications.

DETAILED DESCRIPTION

The method and apparatus of the present invention will be described using an example of a digital information commodities exchange. However, the present invention is not limited to the exchange of the specific digital information described below.

In a digital information commodities exchange operating according to the present invention, the exchange commodity comprises digital information packets. The information, which can represent a variety of different kinds of data, is encoded in a standard format by a modular unit operated by the publisher/subscriber. The modular unit is expandable.

A commodities exchange includes a system capable of performing four functions: receiving/storing notification of the availability of a particular digital information packet, receiving/storing a digital information packet from a publisher, sending a digital information packet to a subscriber, and maintaining records of a subscriber and/or publisher transaction.

A publisher transmits a notification of the availability of a digital information packet to the exchange. The publisher may also notify subscribers directly of the availability of such information in a variety of ways. The publisher can, for example, advertise within the exchange itself or in any other medium such as print (e.g., newspapers). A subscriber can then request transmission of such a packet from the publisher. This publish/subscribe transaction could occur in real time, e.g., the subscriber could achieve access to a live concert, or it could be separated in time, e.g., a subscriber could access a video game that had been published weeks or months earlier. In either case, the publisher transmits the digital information packet over the selected transmission medium to the exchange. To perform the publication transmission, the publisher is connected to the exchange system using a modular expandable unit and the transmission medium of his or her choice. Likewise, the subscriber is connected to the exchange using a modular expandable unit and the medium of his or her choice.

Upon receipt of a digital information packet from the publisher, the exchange system is capable of sending the packet to the requesting subscriber. The subscriber requests a particular packet using a simple menu-driven process jointly administered by the subscriber's modular expandable unit and the exchange system. To receive the transmission, the subscriber is also connected to the exchange system through his or her own modular expandable unit.

The exchange system consists of a network of computers (that may be geometrically dispersed) and the communications devices to send and receive various data over various media.

Figure 1:
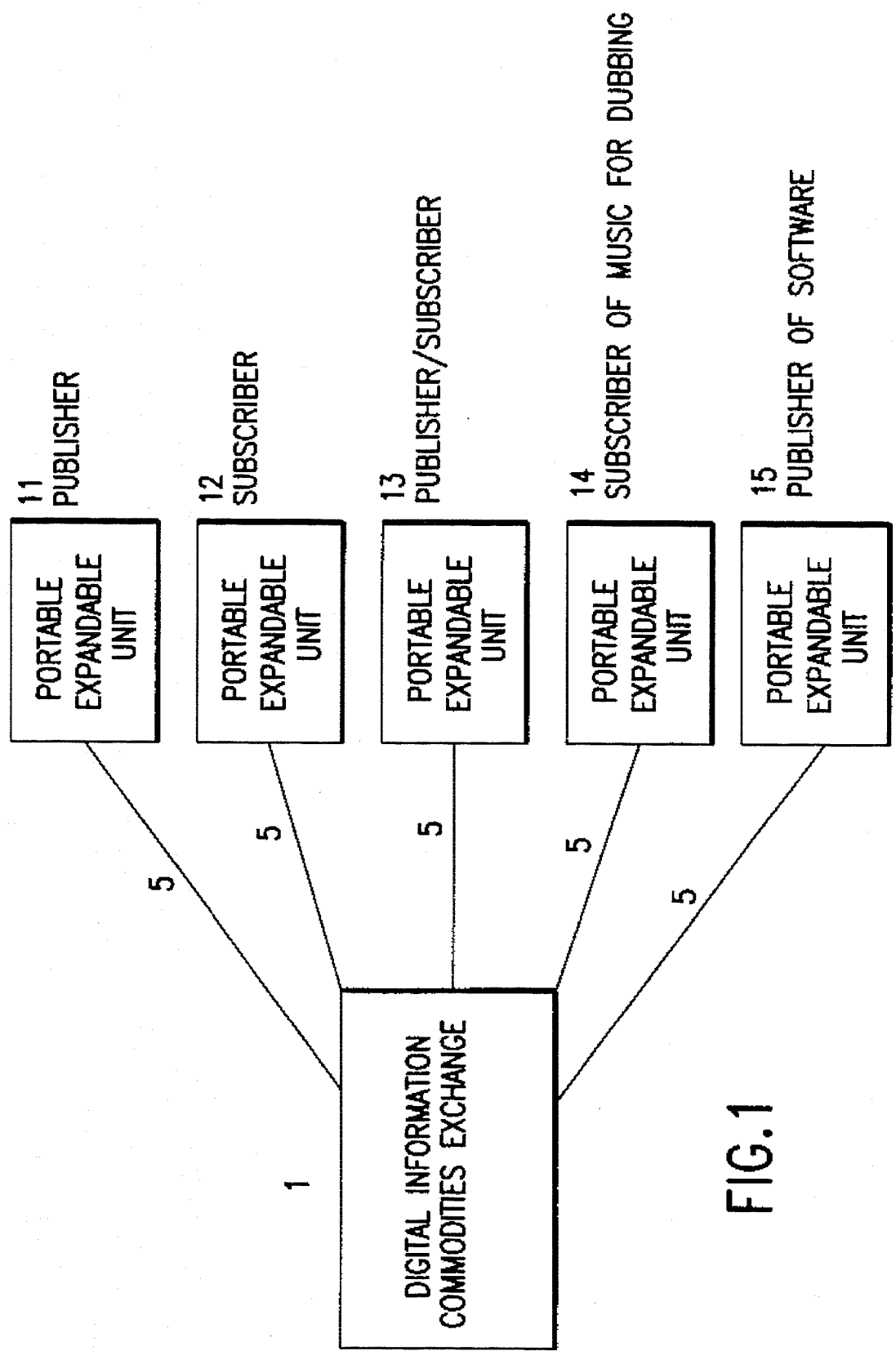
FIG. 1 shows the layout of a small data exchange network in accordance with an embodiment of the present invention, as well as each consumer's intended use.

FIG. 1 exhibits a proposed embodiment where the digital information commodities exchange is connected to a number of publishers and subscribers. For the sake of illustration only five users are shown. Element 1 is a commodities exchange system which has the ability to handle many simultaneous publication/subscription sessions. Element 11 is a modular expandable unit of a publisher of digital information packets. In this instance the packets produced by publisher's unit 11 relate to audio data such as music. Element 12 is a modular expandable unit of a home subscriber who can receive data in a variety of forms, including text, audio, video or computer program data. Element 13 is the modular expandable unit of a user who intends to both subscribe and publish digital information packets, in particular audio information. Element 14 is the modular expandable unit of a subscriber who intends to receive music to dub onto his or her own home video tapes. Finally, element 15 is the modular expandable unit of a publisher of digital information packets for hand-held computer games. Initially the publisher 11, using his or her own modular expandable unit, contacts the exchange to make a publication request and to register the publication parameters: artist, title, pricing, marketing plan, etc. This is accomplished via point selections from menus on the modular expandable unit which is interacting with the exchange. At this point the publisher may wait for a request from a subscriber. Alternatively, depending on the storage capabilities of the exchange, the publisher may wish to store his or her publication on the exchange so that it would be immediately available to subscribers. In this situation a publication-recording session must occur. The publisher 11 might have recorded the audio publication on digital audio tape and would then play and transmit it to the exchange via his or her modular expandable unit and the transmission medium of his or her choice. Alternatively, the publisher may elect to transmit live via an analog-to-digital conversion system to the exchange. In either case the session would be played to completion and stored on the exchange at an appropriate address whereupon the publisher would indicate termination by a signal from the modular exchange unit and the exchange confirming the same.

The subscriber of element 14, after learning of the newly available digital information packet, in this example music, would then use his or her modular expandable unit to make a subscription request to the exchange, using the transmission medium he or she prefers. Again, by moving through a series of menus that refine his or her choices, the subscriber chooses the desired music item. The first menu might list music as one category of available packets, the second menu might list styles of music, the third might list particular artists, the fourth might list of an artist's albums and the fifth menu might be a list of the songs in a particular album. A particular song, group of songs or an entire album may be subscribed as a single digital information packet.

After the subscriber has selected the particular digital information packet which he or she would like to receive, the exchange 1 receives the request, notifies the publisher's computer (or modular expandable unit) that the digital information packet is to be transferred, prepares the selection for transmission, confirms that the subscriber's modular expandable unit is ready, and proceeds to transmit the selected digital information packet. The quality of this publication will depend on the quality of the publisher's recording equipment and likewise the quality of the subscription depends on the subscriber's equipment.

Figure 2:
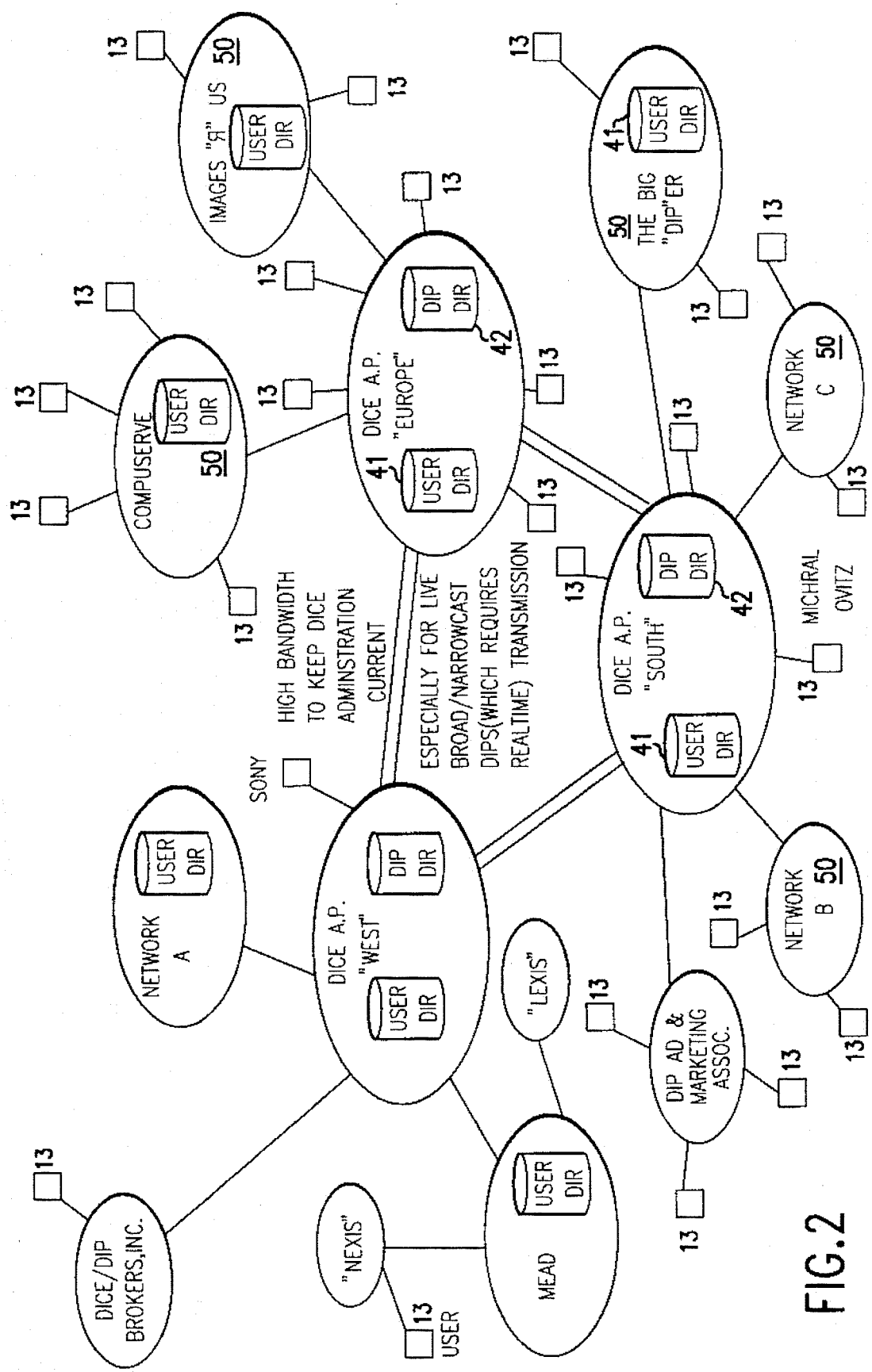
FIG. 2 shows the implementation of a data exchange system with three hubs. Several networks are attached to each hub.

FIG. 2 exhibits a similar system as FIG. 1, but on a considerably larger scale. In this figure several different exchanges 1 are illustrated, each with an arbitrary number of modular expandable units 13 attached to it. This figure also illustrates that a single exchange 1 can be connected to other exchanges 1, as well as to modular expandable units. In this way the network can spread in a horizontal sense so as not to overburden a single exchange with too many units 13. Also, the network can spread in a vertical sense by nesting one exchange within another. Note that this configuration allows the network to incorporate and complement existing systems, such as Compuserve®, etc.

As is evident in FIG. 2, a distinguishing feature of the exchange of the present invention and other exchanges or networks lies in the administrative functions the exchange performs. Each exchange has a user directory 41 and a digital information packet directory 42. Digital information packet directory 42 does not contain the actual packets themselves, but rather is a list of where the packets are located on the exchange. The user directory 41 is a list of which users are located at which addresses on the exchange. In contrast, networks not of the present invention, denoted 50 in FIG. 2, need only have a user directory 41. This is because their "digital information packets" are contained within their central singular computer rather than distributed amongst many different digital commodities 'brokers' 13. Finally, it is important to note that user 13 is not limited to those digital information packets located in the directory 42 of his or her own particular exchange 1. This is because a particular exchange 1 may also search other exchanges throughout the system for a particular requested digital information packet. This packet could then be sent to the user in a manner completely analogous to the transfer of a packet from a publisher to a subscriber.

Although the best quality recording is stored on a master tape originally made at the studio, exceptionally high quality reproductions can be achieved after a conversion to a compact disk standard format (CD). Thus, it is likely that the publisher will upload the reproduction from a compact disk. While a typical CD player would convert the data from a digital format to an analog format before sending it to the amplifier, in this case the signal could be removed from the CD player at 31 in a digital format and could be directed to the modular expandable unit's expansion module in that same format. The expansion module 32 provides the necessary connectors to interface the CD player with the modular expandable unit through the control unit 33. The modular expandable unit can then provide any necessary data compression. The signal can then be sent over a telephone line 5 via a modem, with the modem also providing the necessary conversion to an analog format. If, in the alternative, a fiberoptic cable were employed, the data could remain in digital format.

Figure 3:
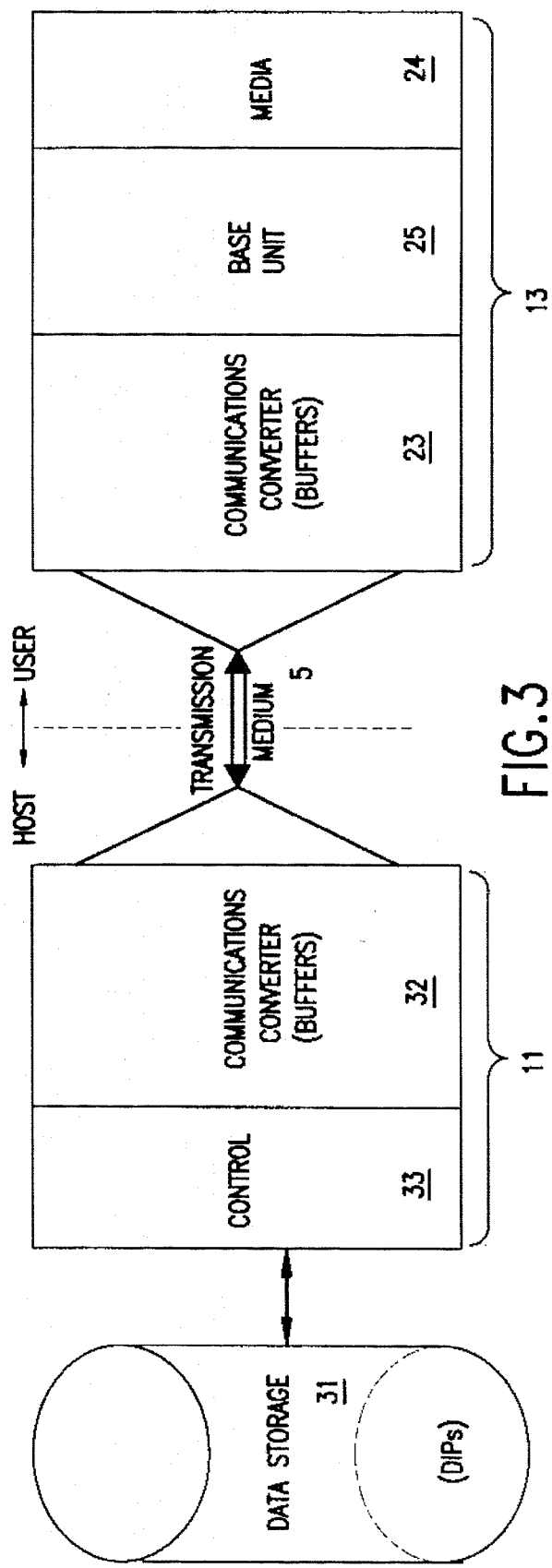
FIG. 3 shows a typical publisher/subscriber connection in an embodiment of the present invention.

The maximum amount of information to be sent can be calculated as follows. Using a band width of 3300 Hz and a signal-to-noise ratio of 20 dB, it is estimated that a telephone channel can handle about 22,000 bits of data per second. Standard modems today have bit rates of up to 19,200 bits per second. Use of an ISDN standard and digital switches would allow a rate of up to 64,000 bits per second to be achieved. A compact disk player, handling the audio frequency range of up to 20 kHz, and taking into account the Nyquist frequency of the disk player and the need for two channels for stereo sound, would require about 80,000 bytes per second. The large data rate mismatch would require, on the publisher's side, a buffer 32, as depicted in FIG. 3, to store data prior to the data being sent over the telephone line. The size of the buffer would depend on the length of the digital information packet to be sent. Once the data is buffered and sent over the telephone line, a buffer 23 on the subscriber's side would restore the data to its original rate. The data could then be stored in a variety of forms. Each buffer 23 forms part of its modular expandable unit. The expansion module 24 could be equipped with both digital and analog outputs. The digital output emerges directly from the modem. The analog output is simply the digital output after processing by a digital-to-analog converter. In the present example, the signal can then be sent into either a digital or analog input of a digital audio tape player.

In the course of buffering the data, compression techniques can be used to speed the transfer. Other techniques, such as storing the data on RAM chips, can be used to minimize the time necessary to maintain the telephone connection. Additionally, if a fiberoptic link is used to transfer the data, the wide band afforded by the fiberoptic would allow the packet to be sent even more expeditiously.

Publishers and subscribers can be connected to the exchange system over any one of a variety of transmission media 5. For example, they may choose to be connected to the exchange system over private circuits, television lines, the public switched telephone network, cellular communications, electric power lines, or even satellite communications. Depending on the type and amount of data to be sent, some of the digital information packets could be sent over one type of medium and simultaneoulsy another part could be sent over a different type of medium. For example, if a movie were to be transmitted to a subscriber, the audio portion of the movie contains considerably less information than the video. Thus, the telephone line, with its limited band width is sufficient to transmit the audio portion of the movie. A higher band width transmission medium such as a fiberoptic, a cable TV line, or a power line could be used to transmit the video, thus allowing a more rapid transfer of a digital information packet. The exchange provides this versatility by being equipped with a large variety of transmitters/receivers interfaced to many types of transmission media.

The exchange system is capable of performing administrative functions with respect to the publication/subscription transactions. The exchange system interacts with publishers and subscribers via menu-driven software so that the users can easily perform the desired transactions. The exchange system can also maintain profiles of subscribers and their usage in such a way that subscribers may be kept informed of newly available digital information packets that may be of particular interest. Publishers may be kept informed of who is subscribing to their publications and any other relevant market information. To support the exchange system, transaction fees may be charged to either the publisher, the subscriber, or both. Furthermore, the exchange system can track the publications and subscriptions so that either the exchange system or the publisher can bill their subscriber for the price of the digital information packets. The exchange can provide many options regarding the commercial aspects of the digital information commodity exchange. For instance, various price mechanisms can be supported. In this way the subscriber can be charged less per packet for ordering a higher quantity of data, or alternatively can be charged less for ordering a data reproduction of lesser quality. For example, a video for use on standard televisions would cost less than one for use on high-definition televisions. Some publishers would pay to have their publications subscribed to. An example might be a car company who would issue an exchange credit for the first 1000 subscribers who receive their video of a test drive of the company's new luxury car. Similarly, receiving a live lecture from a Nobel Laureate might cost more than receiving the same lecture pre-recorded.

Figure 4:
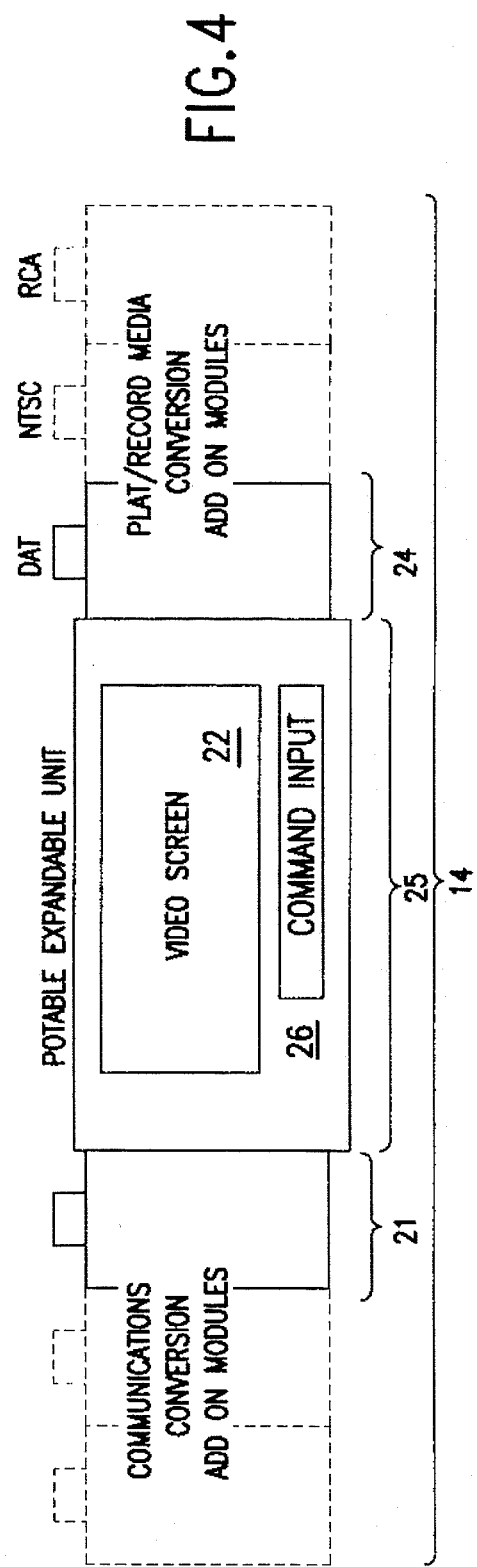
FIG. 4 shows a modular expandable unit, including its base system, communications converters, and expansion modules according to an embodiment of the present invention.

FIG. 4 schematically illustrates a modular expandable unit. A modular expandable unit can provide the interface to the exchange system for either a publisher or a subscriber. A base system of the modular expandable unit is used to send requests to the exchange and may include a small video screen 22, an apparatus for inputting commands 26 (e.g., a keyboard or a pointing device), and software for user interaction. The software serves to configure the hardware and to control the conversion of data with the appropriate add-on communication module. The unit is also capable of sending digital information packets to the exchange system, receiving digital information packets from the exchange system, reformatting data received from the exchange system for replaying on a specific device, and playing or recording digital information packets thus received.

The modular expandable unit is capable of sending and receiving digital information packets to and from the exchange system over a selected transmission medium 5. The unit may also have a variety of expansion modules 24 available, some of which serve to format a particular data type and others which serve to adapt the modular expandable unit with a particular transmission medium. For example, if a publisher wants to send a digital information packet from a digital audio tape over an ISDN connection to the exchange (DAT), the modular expandable unit would have an expansion module 24 allowing the modular expandable unit to interface to an appropriate digital audio tape device and would have an expansion module to interface to the ISDN circuit. The data coming from the DAT device would be received by the expansion module, reformatted and buffered, as necessary, by the unit and then the modular expandable unit would send the data to the exchange system 1 over the selected transmission medium 5. Examples of appropriate expansion modules 24 for audio data are those that accommodate devices using digital audio tapes, digital compact cassettes, analog speakers, analog cassettes, 9-track tapes, and telephones, however, other expansion modules might be used. Standard interfaces also exist for other data types: NTSC video, serial/parallel PC, Group III fax, etc.

In the example noted above, the subscriber at element 13 received a digital information packet from a publisher at 11. This same subscriber may wish to send a digital information packet to the publisher for review, and perhaps future publication. Thus, the consumer at element 13 will then in turn be acting as a publisher. If the consumer at element 13 is a relatively small publisher, the manufacturing technology of producing a compact disk may be unavailable. He or she can still, however, record a digital information packet on an analog or digital audio tape. That digital information could then be sent to the exchange system using the same technique described before. In this case, rather than a menu-driven method of locating the information, the consumer may use a known address to send the information to the recipient. The recipient of the digital information packet at element 11 may store the data in RAM or perhaps in a tape format. The consumer at element 13 does not require a digital audio tape player; a regular analog tape player suffices. In that case, however, the modular expandable unit to which it would be connected would need to be equipped with an analog-to-digital converter which could convert the data on the tape to a form usable by the modem. As stated before, this is because the bandwidth needed for most music is about 20 kHz while the bandwidth usable by a telephone is on the order of 4 kHz.

In addition to audio data, the modular expandable unit could also interface with video data devices and computer data devices through appropriate expansion modules 24. Examples of appropriate expansion modules for video data are those that would interface with devices using VHS tapes, Beta tapes, VHS-C tapes, and 8 mm tapes. Examples of appropriate expansion modules 24 for specialized video data are those that accommodate high-resolution video/graphics screens. Examples of appropriate expansion modules 24 for computer data are those that accommodate devices using parallel ports, serial ports, printers, magnetic disks, magnetic diskettes, magnetic tape, flash RAM, EPROM, and ramdisks. Of course, for all of the above varieties of data, if the data type is initially analog, it must be converted to one of the standard digital formats prior to being published on the exchange. This analog-to-digital converter can be a separate module attached to the modular expandable unit and may be bidirectional.

The modular expandable unit 14 is capable of receiving digital information packets from the exchange system 1 over the selected transmission medium 5. After the subscriber requests a particular digital information packet, the requested digital information packet is transferred to the modular expandable unit via the selected transmission medium. The received requested data could be played in real time, could be stored in temporary memory for a later one-time-only play, or could be directed through an appropriate expansion module 24 to a particular recording device, such as those named above, where it may be repeatedly played.

The modular expandable unit would further be capable of recording and playing back digital information packets received from the exchange system 1. Once the digital information packet has been received by the modular expandable unit 14, it is directed to an expansion module 24 which acts as an interface for a particular device which is related to the type of data received. For example, if the requested digital information packet is a computer program, the modular expandable unit 14, through the appropriate expansion module 24, could store the program onto a hard disk or diskette. In this same example, if a computer program required a particular operating system with which to run, the operating system could also be downloaded as a separate digital information packet. In addition, if the publisher desires, a copy-inhibit feature could be included by the publisher and would be transmitted along with a particular digital information packet to prevent software piracy.

The received data can then be sent from the modular expandable unit 14 to any of the devices that can use digital data and are connected to the expansion modules 24 as described above.

In the example shown in FIG. 1, a subscriber at element 14 wants to receive a digital information packet from publisher 11. This digital information packet could, for example, be music which is to be dubbed onto a home videocassette. In this case, the transfer would be similar to that described above. The music would be replayed at element 11, buffered, sent over the phone line 5 to the exchange system 1, and then sent to the modular expandable unit 14 to be re-buffered at 21 and output as a digital information packet in the same form as it was played by the publisher. This digital information can then either be sent, in this example, to the digital audio input of a videocassette recorder, or can be first sent to a digital-to-analog converter, and then sent to the analog audio input of a videocassette recorder.

In the example shown by FIG. 1, the publisher at 15 could be a software publisher who sells software products over the digital information commodities exchange to subscribers. A subscriber at element 12 could use the same menu-driven process as described above to request a particular digital information packet, in this case a software product. The program might then be uploaded from the publisher to the exchange system 1 and sometime later downloaded to a requesting subscriber. This type of transfer would be considerably quicker and simpler than the above mentioned transfer of video and audio digital information packets, because there is usually much less information contained in this type of digital information packet.

The present invention is well-adapted to the recent development of multimedia microprocessors. For example, AT&T's 32-bit Hobbit microprocessor has a built-in communications ability, as well as a multitude of connectivity products being designed for it. These include applications allowing users to interact with multimedia in real-time over telephone lines. Such a microprocessor would well serve the needs of a digital information commodities exchange and in particular the modular expandable unit. Depending on the connectivity of the products that are designed for the Hobbit microprocessor and its built-in communications facilities, the need for elaborate buffering of data may be less necessary than envisioned above. For example, the Hobbit microprocessor's communications abilities may be used to simplify much of the transmissions requirements.

Menu-driven software on the modular expandable unit would allow users to request digital information packets. This software interacts with software running on the exchange. Communications software on the exchange and on the modular expandable unit coordinates the transmission of digital information packets between them.

The menu-driven software could first request a publisher/subscriber,s identification number and password for verification. The software would then inquire whether the publisher/subscriber chooses to publish a digital information packet, subscribe to a digital information packet, or gather information about a digital information packet.

If the publisher/subscriber chooses to subscribe to a particular digital information packet, he or she would conduct a search to find that digital information packet by maneuvering through one or more menus and thereupon requests it. If publisher/subscriber wishes to post a publication on the exchange, he/she also "logs in" but then inputs the particulars of his/her publication. The menu-driven software can be similar to that used, for example, by the Prodigy Network where the user first views a menu with a choice of different types of news stories, such as business news, politics, sports, etc. Once the subscriber chooses a particular type of story, the subscriber is then presented with another menu with a choice of other stories, all within that same type of news. After choosing a story from this menu the user is then actually looking at the text of a news story. Alternatively, a program similar to Apple Computer's Applesearch program could be employed to facilitate key word searches of data. Applesearch is also used to rank the retrieved documents by relevance. In the present system, the user would have a menu with choices of different types of data to request. These menus would ask the user if the information requested is textual, visual, aural, etc. or a combination of these. The categories would further divide into news, music, movies, educational, and other subdivisions. After several iterations of choices, the user would find the appropriate digital information packet, and request it. The user further could specify to what device the digital information packet is to be sent. The exchange system, after verifying the functionality of all the appropriate ports, would arrange the transfer, from the digital information commodities exchange, of the requested digital information packet to the subscriber's modular expandable unit where it would be directed to the expansion module associated with the specified attached device, and optionally would bill the subscriber accordingly.

If the publication is meant for real-time access and the publisher is connected to the exchange at all times, then the information could be routed from a publisher to a subscriber at any time the subscriber chooses. If this publisher is only intermittently connected to the exchange system, then the subscriber would wait until the publisher is on-line again before the data could be requested and transferred from the publisher through the exchange system 1 to the subscriber. Alternatively, if the publisher has stored his or her publication on the exchange, the digital information packet would be available whenever a subscriber wishes to subscribe to it. In any case, after the subscriber specifies the digital information packet to be sent, notification of the time of sending, whether immediate or in the future, would be given to the subscriber.

If the publisher/subscriber chooses to publish a particular digital information packet, occasionally in response to a subscriber request, he or she could replay the digital information packet and also describe to the exchange system 1 what the electronic standards are for replaying the data. The publisher also specifies price and distribution information. The publisher then specifies to which subscriber the digital information packet is to be sent. The exchange system again verifies the functionality of the selected ports. The digital information packet is then sent through the exchange system to the subscriber. Billing information is again recorded.

To verify the integrity of a received digital information packet, a data flag could be put on to the end of the digital information packet. The flag would thus notify the exchange that the entire packet was received. The publisher/subscriber would then choose to publish another packet, request a packet, or disconnect the call.

The invention describes an exchange where the traded commodities are digital information packets. The digital information packets consist of a wide variety of different types of data. A relatively large number of publishers can make available a number of different data types to an equally wide variety of subscribers. The subscribers, via their modular expandable units with menu-driven software, can specify which digital information packets they would like to receive, in which format they would like to receive the data, and whichever transmission media they may prefer. Once the exchange is made aware of the subscriber's request, it sends the requested digital information packet to the subscriber. The exchange system records information about all the publication/subscription transactions and bills the publishers and subscribers accordingly.

What is claimed is:

1. A system for the exchange of digital information packets, comprising:

an exchange including a plurality of connectors for interfacing said exchange to a plurality of transmission media;

a plurality of modular expandable units, each of said plurality of modular expandable units having at least one input source terminal, at least one output terminal, and a central processing unit between said at least one input and said at least one output terminals; and at least two transmission media;

wherein said plurality of modular expandable units are connected to said exchange through said at least two transmission media to allow a first transfer of a user-selected amount and type of digital information from a first one of said plurality of modular expandable units to a second one of said plurality of modular expandable units, wherein said user-selected amount and type of digital information is selected by inputting commands via an input device to software within each of said plurality of modular expandable units which locates and requests the transfer of the digital information packet, and wherein said plurality of modular expandable units are connected to said exchange through said at least two transmission media to allow a second transfer of a user-selected amount and type of digital information from the second one of said plurality of modular expandable units to at least a third one of said plurality of modular expandable units, such that said first one of said plurality of modular expandable units transfers data to said second one of said plurality of modular expandable units over at least two transmission media simultaneously.

2. The system for the exchange of digital information packets of claim 1, wherein said output terminal include a module selected from a plurality of available expansion modules, each of which can accomodate one variety of signal output.

3. The system for the exchange of digital information packets of claim 1, wherein said central processing unit includes:

software running on a microprocessor suitable for selecting digital information;

a system for entering commands;

an input;

an output; and a serial line such that said serial line connects said at least one input to said at least one output.

4. The system for the exchange of digital information packets of claim 1, wherein said central processing unit includes:

software suitable for selecting digital information;

a system for entering commands; and a parallel line;

such that said parallel line connects said at least one input to said at least one output.

5. The system for the exchange of digital information packets of claim 1, further comprising:

an information buffer connected to said expandable module;

such that said information buffer allows for the asynchronous communication of digital information between said exchange and one of said two modular expandable units over said at least two transmission media.

6. The system for the exchange of digital information packets of claim 1, further comprising:

an information buffer connected to said exchange;

such that said information buffer allows for the asynchronous communication of digital information between said exchange and one of said two modular expandable units over said at least two transmission media.

7. The system for the exchange of digital information packets of claim 1, further comprising an expansion module coupled to said input source terminal, said expansion module accommodating a particular variety of signal input.

8. The system for the exchange of digital information packets of claim 1, wherein said exchange may be communicably connected to another exchange.

9. A system for the exchange of digital information packets, comprising:

an exchange including a plurality of connectors for interfacing said exchange to a plurality of transmission media;

a plurality of modular expandable units, each of said plurality of modular expandable units having at least one input source terminal, at least one output terminal, and a central processing unit between said at least one input and said at least one output terminals; and at least one transmission medium;

wherein said plurality of modular expandable units are connected to said exchange through said transmission medium to allow the first transfer of a user-selected amount and type of digital information from a first one of said plurality of modular expandable units to a second one of said plurality of modular expandable units, and wherein said plurality of modular expandable units are connected to said exchange through said transmission medium to allow the second transfer of a user-selected amount and type of digital information from the second one of said plurality of modular expandable units to at least a third one of said plurality of modular expandable units, such that said first one of said plurality of modular expandable units transfers data to said second one of said plurality of modular expandable units over at least two transmission media simultaneously.

* * * * *